(12) United States Patent (10) Patent No.: US 7,861,327 B2
White (45) Date of Patent: Jan. 4, 2011

(54) WATER CONSERVATION APPARATUS

(76) Inventor: Chester White, P.O. Box 730647, Elmhurst, NY (US) 11373

( * ) Notice: Subject to any disclaimer, the term of this patent is extended or adjusted under 35 U.S.C. 154(b) by 509 days.

(21) Appl. No.: 12/009,897

(22) Filed: Jan. 22, 2008

(65) Prior Publication Data
US 2008/0216223 A1    Sep. 11, 2008

Related U.S. Application Data

(60) Provisional application No. 60/881,219, filed on Jan. 20, 2007.

(51) Int. Cl.
*E03D 9/02* (2006.01)
(52) U.S. Cl. ......................................................... 4/223
(58) Field of Classification Search ............. 4/222–226, 4/415
See application file for complete search history.

(56) References Cited

U.S. PATENT DOCUMENTS 5,073,992 A * 12/1991 Herring et al. ................ 4/227.1
6,772,450 B1 * 8/2004 Saylor et al. .................... 4/223
2004/0049839 A1 * 3/2004 MoodyCliffe et al. .......... 4/223

* cited by examiner

*Primary Examiner*—Charles Phillips

(57) ABSTRACT

A water conservation system is provided public and domestic lavatories. The system includes a distinctive flush mechanism of two features. One of these features entails a "treatment button" which, upon depression, will cause to emit a fluid compound into urinated wastewater decolorizing and sanitizing it and bringing it back to its original, colorless, odorless condition. Accordingly, potable water is not used for flushing. The urinated wastewater is "treated" and, so, remains through subsequent "treatments" until such time when solid waste is deposited necessitating a conventional flush utilizing the flush lever and usual water use. The savings in volume of water is realized upon considering the number of times the "treatment button" is executed and potable water is "not withdrawn." The system is revolutionary in that it dispenses with a "necessary flush" each time the toilet is used. Moreover, this novel system addresses the recurring local, and national, drought emergency situations.

3 Claims, 5 Drawing Sheets

WATER CONSERVATION APPARATUS

This application references Provisional Application No. 60/881,219 Filed Jan. 20, 2007 for date of priority.

BACKGROUND

1. Field of Invention

The Present invention relates generally to potable water conservation capabilities of a toilet, but, more specifically, to a water treatment and conservation method for domestic, in-home, and public, toilet wastewater.

2. Description of Prior Art

The present invention will prove to be a breakthrough in the specific area of natural resources conservation. It is a water conservation system that, once generally utilized, introduces a truly unique and revolutionary way of solving the national, and international, dilemma of frequent water shortages. Once adopted and put into practice, it will immediately begin to offset the drought emergency concerns, which have become problematic for many states and municipalities across the United States. Though water maintains a "relative" constant volume in the hydrosphere, natural climactic phenomena have caused and will continue to cause, smaller, or greater, fluctuations in water containment systems throughout the global environment. It is a safety, (precautionary) measure against such fluctuations, which can be severe in certain areas, that the present system is directed. In addition, and more directly, this system will prove itself highly valuable for both multiple-dwelling unit owners and private homeowners when considering exorbitant water-bill expenses. The present invention will assume approximately four fifths less use of potable domestic water. Prevalent toilet flushing systems are wasting huge capital sums in addition to bringing about a disparity in water allocation around the world. The novel idea, being herein presented, is revolutionary since it negates a "necessary flush" each time the toilet is used. It is simple to operate, and, once implemented widely, it will save a tremendous amount of capital resources.

Numerous toilets have been provided in prior art that are each a disposal apparatus consisting of a porcelain bowl that is fitted with a hinged seat and a flushing device, used for both liquid and solid human wastes. While these units may be suitable for the particular purposes for which they are designed, they would not be suitable for the purposes addressed by the present art. In essence, they are not designed to conserve significant volumes of potable water for human consumption, nor are they efficient in resolving both the national, and global, concern for, both, water conservation, per se, and with respect to private, public, local, and global water usage economic expense.

For the present component system, the amount of water conserved is assessed cumulatively every time the toilet does not have to be flushed after an event wherein there is liquid waste deposited into the bathroom commode. It constitutes and substantiates the efficacy of the novel system for the conservation of domestic water usage and, therefore, if carried into general use, would eliminate the ongoing serious concerns for drought conditions, nationally and globally. Moreover, the financial burdens experienced by homeowners, landlords, and others tied to "metered" water usage would be greatly alleviated upon implementation of the systems herein described.

The liquid substance should be one whose overall effect, upon its intromission into urinated wastewater, would be to "revert" the water, (contaminated by the coloring substances, the biochromes, bacteria, etc. or urine) back to the pre-urinated, natural, clarified, state or condition. The cumulative, treated, "clarified," water REMAINS through successive "treatments:" intromission of achromatizing fluid. Water level will remain constant until solid waste is a factor upon which time conventional water flush becomes necessary. In this, latter, case, the usual water flush, (lever) is effected. The significance of the amount of water conserved can be realized by way of calculating the statistical ratio of "treatments" to the combined number of flushings of liquid as well as solid waste.

SUMMARY OF THE INVENTION

The concept is, essentially, a Composition of Matter and structural component system that features, first of all, a fluid emission button which would, upon depression, cause to permeate into standing urinated wastewater, a measured amount of "treatment fluid," (achromatizing fluid) from a treatment fluid fill tank. The interaction of the fluid immediately dissipates the characteristic yellowish or brownish hue of urinated wastewater after urine had been deposited into it, changing it back to the colorless appearance of the pre-standing water. In addition to treating urinated wastewater by removing its coloring substances, the fluid will also provide a germicide and other compounds for safe and efficient use of the system. The alternative emission mechanism for operation of this system is the lever that is depressed for complete flushing of the urinated wastewater in the commode at such time that there is solid waste.

The process will also include the permeation of a requisite germicide, in addition to the above-mentioned treatment for removing the coloring substances. The cumulative, "treated," clarified water remains through successive "treatments." The water level will remain constant until solid waste is deposited. In this instance, the usual water flush, (lever depression) is effected. The significance of the amount of water conserved can be realized by way of calculating the statistical ratio of treatments to the combined number of flushings of liquid, as well as solid waste.

Another object is to provide a water conservation system for a commode that utilizes a double-featured mechanism that, in one instance, will normally flush through the commode solid waste while the alternative instance will allow a treatment fluid to enter the commode to dilute the coloration factors in urine so that the commode does not have to be flushed until solid waste is deposited thus saving volumes of potable water.

An additional object is to provide a water conservation system for a commode that will reduce the amount of water needed to operate the commode since it will require approximately four fifths less use of potable domestic water.

Another object is to provide a water conservation system for a commode that is simple, easy, and economical to use. Further that, due to the process involved, the hygienic propriety and discretion are maintained in that the component herein being presented presupposes that a user of the system utilizes a dissolvable toilet tissue for cleansing private parts. Such (biodegradable) toilet tissue disintegrates, dissolves, and becomes transparent after (non-flush) "treatment" use. Therefore, there are two separate toilet tissue dispensers: the common dispenser roll for conventional hygienic cleansing after solid waste use and a separate and distinct dispenser for non-flush, "treatment," usage. This, latter, dispenser issues a hygienic tissue that is used only for hygienic purposes after deposit of liquid waste.

Still, another object is to provide a water conservation system for a commode that is economical in cost to the manufacturer and for the consumer. Other objects of the invention will appear as the description proceeds.

The primary object of the present invention is to provide a water conservation system for a commode that will overcome the shortcomings of the prior art devices that do not conserve significant amounts of potable water.

To the accomplishment of the above and related objects, this invention may be embodied in the form illustrated in the accompanying drawings.

REFERENCE NUMBERS IN DRAWING

Figure 1:
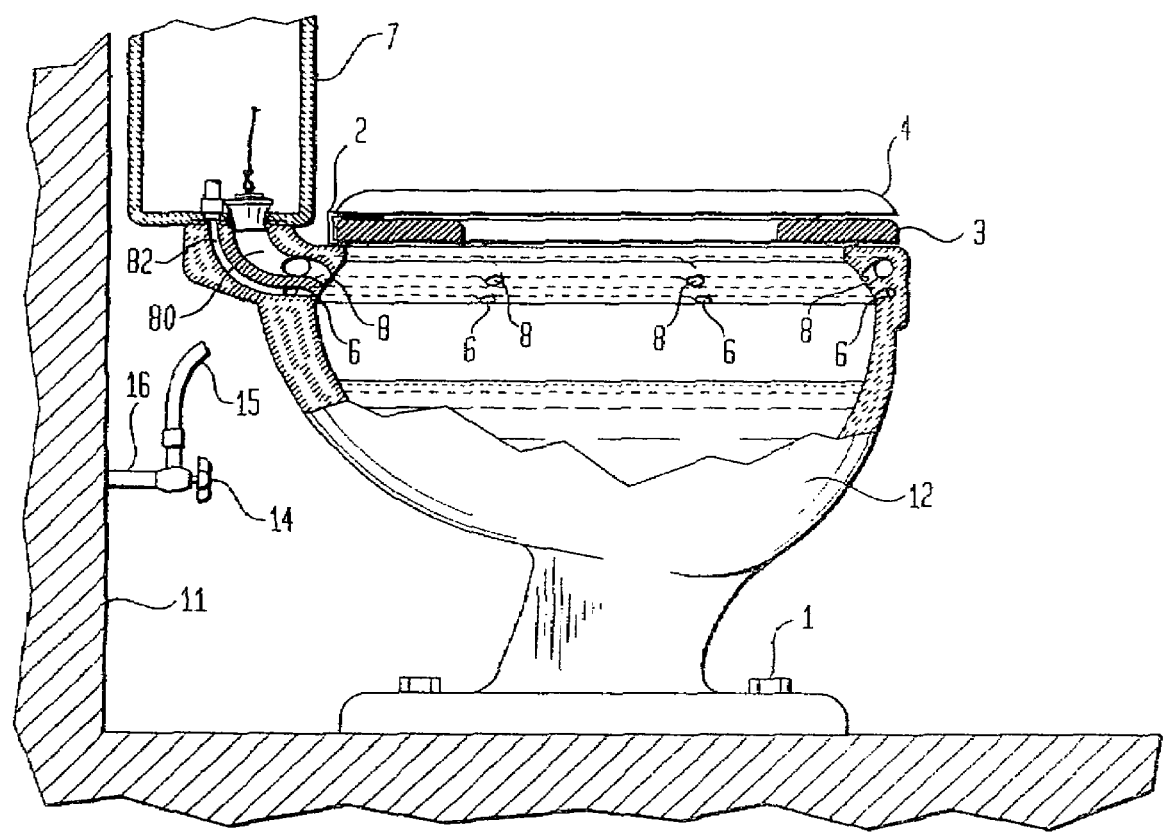
FIG. 1 is a partial cross-sectional view of a commode of the invention.

1 Bolt Securing base of commode to surface of floor
2 Hinge section of commode toilet seat
3 Toilet seat to commode
4 Top lid of commode
6 Treatment Outlet Holes
7 Water Tank
8 Flush Outlet Holes
11 Wall surface of a bathroom
12 Bowl of commode
14 Control knob for control of municipal water supply
15 leader hose to 81 Water Tank Inlet
16 Toilet Pipe leading from municipal, (public) water supply source
18 Chemical Treatment Substance, (achromatizing fluid)
24 Water Tank Cover
26 Lever for conventional flush of toilet (solid waste)
30 Treatment Tank Pipe
34 Chemical Treatment Button
40 Chemical Treatment Tank
80 Flush Intake, (conventional water flush)
81 Water Tank Inlet
82 Commode Treatment Intake Line (for fluid treatment process)
83 Leveling Arm Rod
84 Level Node
85 Float
86 Float Control Arm
87 Tap, (occludes intake of water once prescribed level is reached)
88 Internal Pipe
89 Fill-cap for achromatizing fluid tank
90 Leveling Arm Rod Insertion Lip
91 Washer
92 Plunger for executing fluid action
93 Spring
94 Treatment Tank Execution Button
95 Clog for release of Achromatizing Fluid
97 Chain
101 Leveling Arm Rod Slot Housing
102 Thrust Occlusion Rod
103 Spring
104 Slot Hole
105 Button Hole
106 Outlet of Achromatizing Fluid to Treatment Tank Pipe
108 Combination fluid Jet Spray and Water intake for flush
110 Hygienic sanitary tissue, (quickly dissolves to transparency in water)
112 Sanitary tissue dispenser, (replaceable canister)

DETAILED DESCRIPTION

Operation

Preferred Embodiment

A preferred embodiment of present invention is presented in two sections: "Flushing" and "Urinated-Water Treatment." Flushing is effected as follows:

Flushing

Water from municipal water supply 16 passes control valve 14 through to water tank inlet pipe 15 and into the water tank 7 using water inlet 81. The tank will continue to fill with water until stopped by action of internal fill pipe 88 and fill tap 87 as the float 85 is raised by the action of the rising water filling the tank. While the water continues to flow into the water tank 7 as water level rises, it contacts the float 85 which has an arm 86. As the water rises, so does the float 85 until it reaches a specified level for occlusion of the tap 87 with the help of the arm 86. This causes the water to stop flowing.

In the event of solid waste deposited into the commode or toilet bowl, the flush lever 26 is depressed causing the level node 84 to rise thereby opening a water tank outlet valve with the aid of the chain 97 causing the water to rush out into the flush intake 80 and out through the flush outlet 8 holes into the commode totally flushing the solid waste matter.

Urinated-Water Treatment

Figure 2:
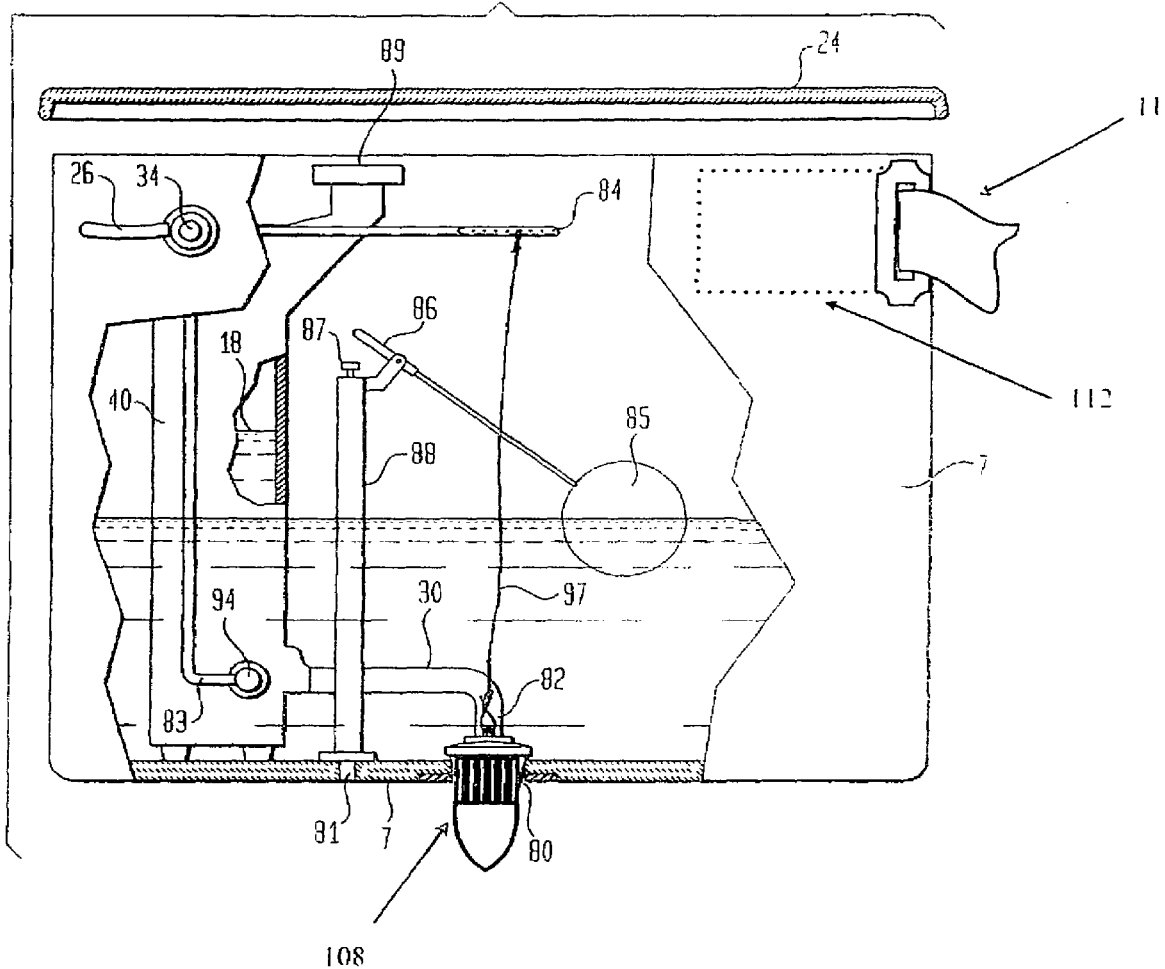
FIG. 2 shows the position of the treatment tank in the flush tank.
Figure 3A:
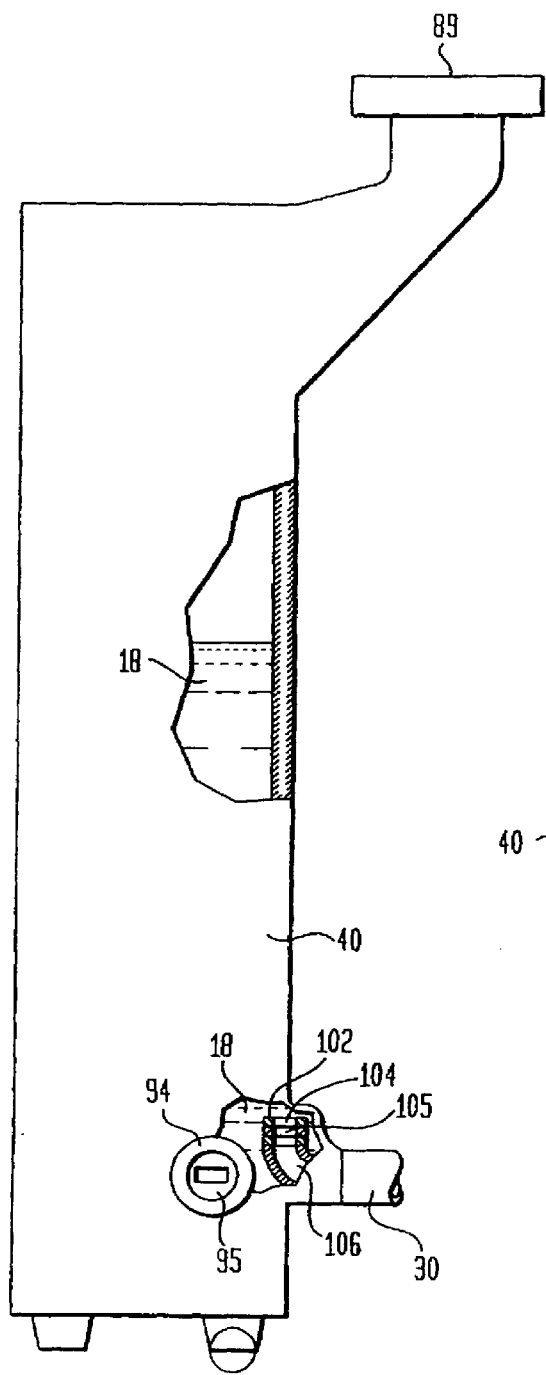
FIGS. 3A and 3B show views of the treatment tank.
Figure 3B:
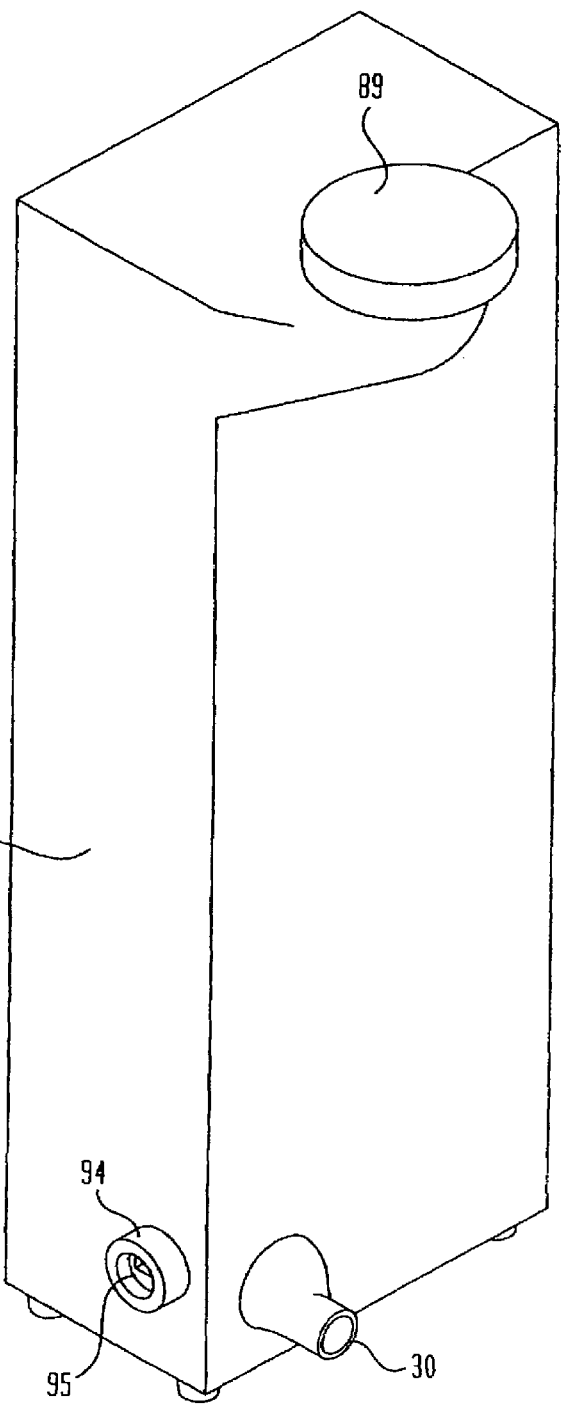
Figure 4:
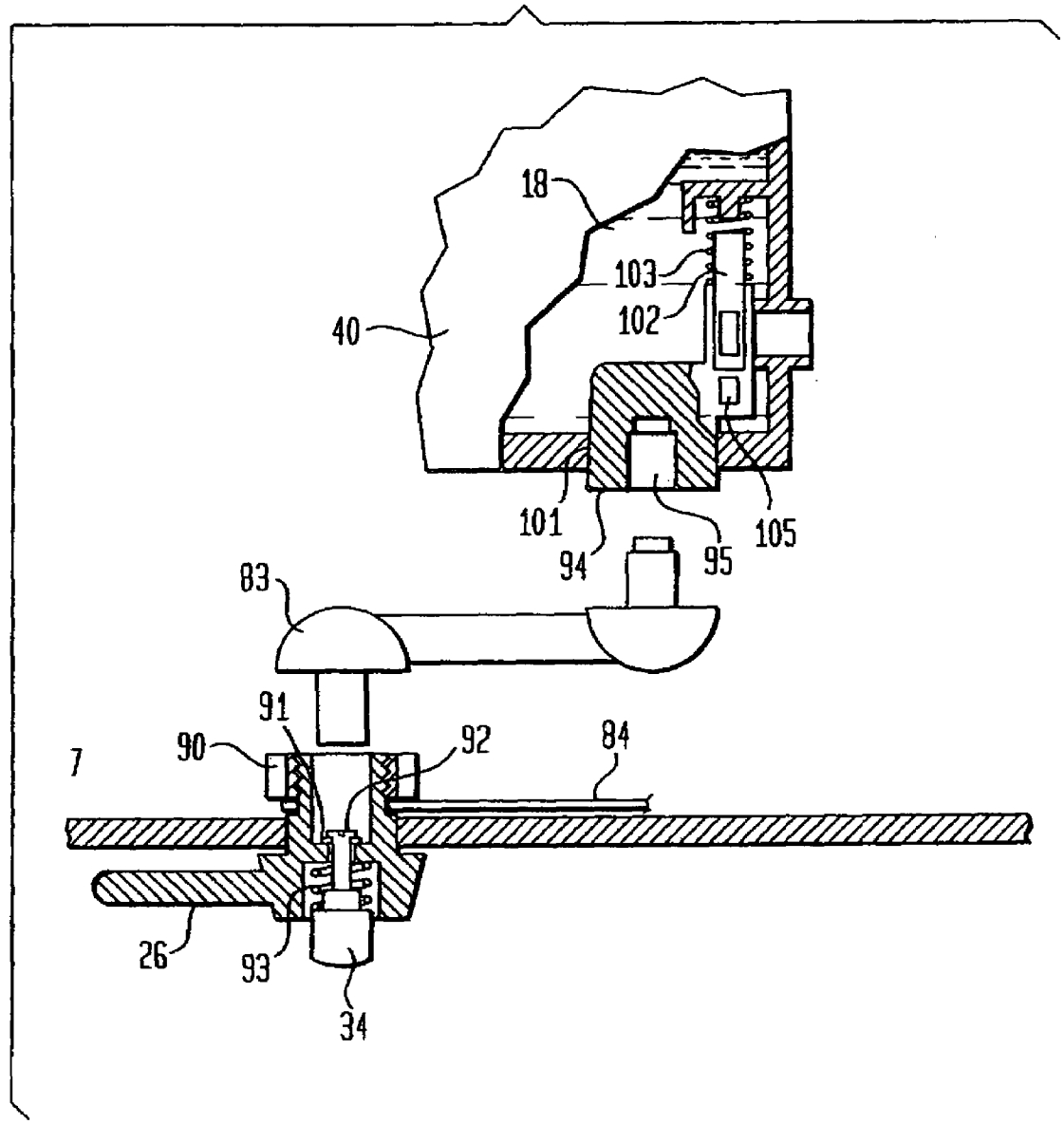
FIG. 4 shows the flush actuator and treatment actuator button.
Figure 5:
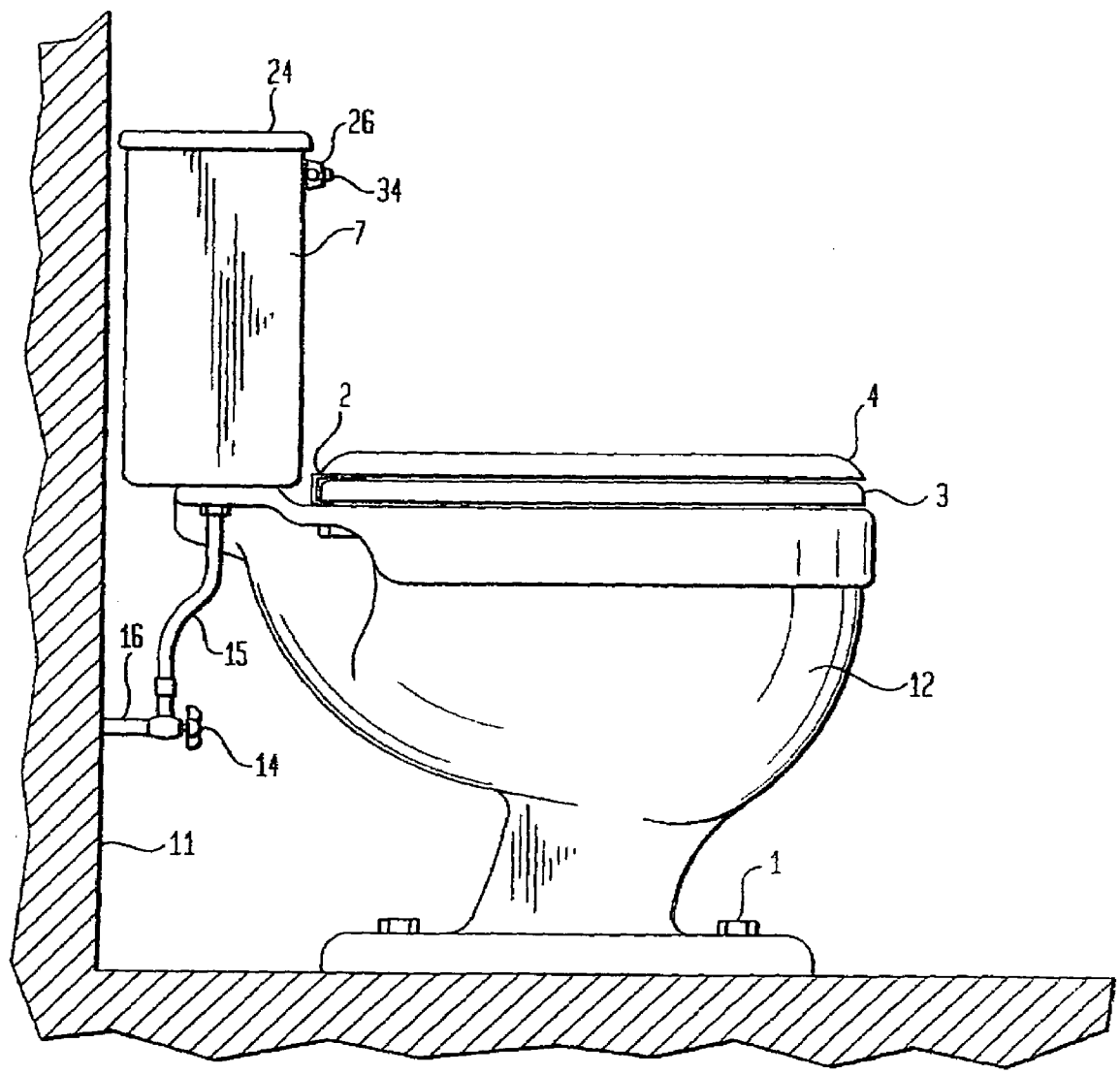
FIG. 5 is a lateral view of the commode.

The water tank cover 24 is removed then the cap 89 of the chemical treatment tank 40 is open and the chemical treatment substance 18 poured into the treatment tank 40, FIG. 2. The fill cap 89 is then placed back onto the treatment tank 40 and the water tank cover 24 is also placed on top.

Upon the deposit of urine only into commode, the treatment button or actuator 34 which, with the assistance of a spring action screw 92, washer 91, and spring, 93 will be depressed. This action pushes the arm rod 83 which links to treatment tank button 94 which has a slot 95. From this pushing motion, the button 94 will move backward into slot hole 104 and button hole 105. These will become aligned causing the chemical treatment substance 18 to flow into the outlet 106, into the treatment tank pipe lead 30, then down into commode treatment intake line 82 and jet-sprayed out by the Combination fluid Jet Spray and Water intake for flush apparatus 108 through treatment outlet holes 6 leading into the standing, urinated water, bringing about a bleaching, "decolorizing," and disinfecting effect upon the urinated wastewater in the commode. Treatment outlet holes may be designed at a lower proximity to the water line, or beneath it, in a commode than is depicted at 6 of FIG. 1. Thus—. 9 wastewater is NOT flushed but remains through successive "treatments" as described, in places elsewhere in this Specification, until such time that solid waste becomes a factor when there will be a usual conventional flush. Each time a given commode is not flushed for liquid/urine waste there is an equal volume of potable water that is not drawn from a given municipal supply potable water resource. This constitutes conservation for the purposes of this novel invention.

The water conservation achromatizing fluid comprises:

a) a bleaching means for diluting and dissipating said pigments in said urinated wastewater in said commode, said pigments being at least the biochromes such as bilin, bilirubin, urochrome, urobilin, and uroerythrin;

b) introducing into said urinated wastewater in said commode at least an antiseptic, and at least a germicide means for mitigating the typical turbid appearance and said adverse bacteriological substances in said urinated wastewater in said commode;

c) a compound agent means for removing bacteria and odor that is usually present in said adverse bacteriological substances in said urinated wastewater in said commode;

d) a compound agent means for introducing at least a germicide agent against said adverse bacteriological substances that appear in said urinated wastewater in said commode;

e) an agent means for rapid activation of said mitigating the typical turbid appearance of said adverse bacteriological substances upon emission into said urinated wastewater in said commode;

f) a minimal viscosity means necessary that said achromatizing fluid may more quickly and extensively permeate said urinated wastewater in said commode;

g) a constituent compound that does not have adverse environmental effects;

h) a constituent compound that is not damaging to human skin upon contact; and i) a constituent compound that is capable of a long storage shelf life, preserving both quality and characteristic potency against degradation and dilution.

The above claims define over Herring et al where a push button dispenser is shown, Saylor et al and MoodyCliffe et al where dispensing to the bowl is performed under the bowl rim, in that none teach the particulars of passage of the liquid treatment as claimed supra.

CONCLUSIONS, RAMIFICATIONS, AND SCOPE

Accordingly, the reader will see that the above-presented novel idea for a water-conservation system is an item that is in great need. In this regard, it should be ascertained that environmental concerns for water conservation will be beneficially addressed if the present invention were to be generally put into use in the United States, as well as in other countries. Moreover, the concerns for drought emergency situations will be lessened. All in all, the prospect of an abundant water supply can now be realized. America, and the world, would benefit immensely in regards to the implementation of the innovative concept herein being presented.

What is claimed as new and desired to be protected by patent is set forth in the appended claims:

1. A water conservation apparatus comprising:
a flush bowl having a toilet flush tank connected thereto, said flush tank having a flush lever mounted thereon for actuating a conventional flush procedure whereby flush water stored in said flush tank is allowed to pass to said flush bowl;
a treatment tank for holding achromatizing liquid therein, said treatment tank being housed in said flush tank, said treatment tank including an inlet in a top portion thereof to receive a supply of said achromatizing liquid and an outlet in a bottom portion thereof to release said achromatizing liquid as well as a tank button for controlling passage of said achromatizing liquid from said treatment tank via said outlet;
an actuator mounted near said flush lever, said actuator when activated, will cause movement of an arm rod which movement will cause depression of said tank button, whereby a predetermined amount of said achromatizing liquid is allowed to leave said treatment tank through said outlet, said achromatizing liquid will proceed from said outlet through a treatment tank pipe traveling through a bottom portion of said flush tank and through a treatment intake line located in a portion of said toilet bowl located under said flush tank, which line leads to outlet openings located in a rim of said toilet bowl, below conventional water outlet openings of said toilet bowl rim;
wherein water conservation occurs after urination only by a user, by depositing said achromatizing liquid into a urine/water mixture of the bowl, in lieu of flushing said mixture from said bowl in a conventional manner.

2. The water conservation apparatus of claim 1 wherein said achromatizing fluid comprises:
a) a bleaching means for diluting and dissipating said pigments in said urinated wastewater in said commode, said pigments being at least the biochromes such as bilin, bilirubin, urochrome, urobilin, and uroerythrin;
b) introducing into said urinated wastewater in said commode at least an antiseptic, and at least a germicide means for mitigating the typical turbid appearance and said adverse bacteriological substances in said urinated wastewater in said commode;
c) a compound agent means for removing bacteria and odor that is usually present in said adverse bacteriological substances in said urinated wastewater in said commode;
d) a compound agent means for introducing at least a germicide agent against said adverse bacteriological substances that appear in said urinated wastewater in said commode;
e) an agent means for rapid activation of said mitigating the typical turbid appearance of said adverse bacteriological substances upon emission into said urinated wastewater in said commode;
f) a minimal viscosity means necessary that said achromatizing fluid may more quickly and extensively permeate said urinated wastewater in said commode;
g) a constituent compound that does not have adverse environmental effects;
h) a constituent compound that is not damaging to human skin upon contact; and
i) a constituent compound that is capable of a long storage shelf life, preserving both quality and characteristic potency against degradation and dilution;
whereby said water conservation apparatus will conserve immense volumes of said potable water in an economically prudent manner;
whereby said water conservation apparatus will provide a means to conserve immense volumes of said potable water for a municipal water source; and
whereby said water conservation apparatus will provide a means to conserve immense volumes of said potable water for reservoirs for the benefit of global human usage.

3. A water conservation apparatus as set forth in claim 1, wherein said actuator comprises a push button mounted with the flush lever.

* * * * *